United States Patent
Lee et al.

(10) Patent No.: US 8,377,609 B2
(45) Date of Patent: Feb. 19, 2013

(54) FUEL CELL BIPOLAR PLATE AND METHOD FOR MANUFACTURING THE SAME

(75) Inventors: Jong Hyun Lee, Gyeonggi-do (KR); Yoo Chang Yang, Gyeonggi-do (KR); Seung Chan Oh, Gyeonggi-do (KR); Jae Jun Ko, Gyeonggi-do (KR); Sang Mun Chin, Seoul (KR); Suk Kee Um, Daejeon (KR); Hye Mi Jung, Seoul (KR); Won Gyu Choi, Seoul (KR)

(73) Assignees: Hyundai Motor Company, Seoul (KR); Industry-University Cooperation Foundation Hanyang University, Seoul (KR)

( * ) Notice: Subject to any disclaimer, the term of this patent is extended or adjusted under 35 U.S.C. 154(b) by 129 days.

(21) Appl. No.: 12/276,756

(22) Filed: Nov. 24, 2008

(65) Prior Publication Data

US 2009/0311574 A1    Dec. 17, 2009

(30) Foreign Application Priority Data

Jun. 16, 2008    (KR) .......................... 10-2008-0056107

(51) Int. Cl.
*H01M 2/14* (2006.01)
*B05D 3/02* (2006.01)

(52) U.S. Cl. ............. 429/518; 429/433; 429/434; 427/8

(58) Field of Classification Search .................. None
See application file for complete search history.

(56) References Cited

U.S. PATENT DOCUMENTS 5,805,049 A * 9/1998 Yamada et al. ................. 338/25

FOREIGN PATENT DOCUMENTS

| JP | 08-167424 | | 6/1996 |
|---|---|---|---|
| JP | 11-126621 | | 5/1999 |
| JP | 2000-323148 | | 11/2000 |
| JP | 2006-156386 | | 6/2006 |
| JP | 2006-164680 | | 6/2006 |
| JP | 2007-005112 | | 1/2007 |
| JP | 2007-035410 | * | 2/2007 |
| KR | 10-2004-0035820 | | 4/2004 |

* cited by examiner

*Primary Examiner* — Barbara Gilliam
*Assistant Examiner* — Angela Martin
(74) *Attorney, Agent, or Firm* — Edwards Wildman Palmer LLP; Peter F. Corless

(57) ABSTRACT

The present invention provides a fuel cell bipolar plate and a method for manufacturing the same, in which a carbon or metal fuel cell bipolar plate is surface-treated with a complex transition metal oxide, which is a main component of a variable resistance heating element having a negative temperature characteristic, so that the bipolar plate can ensure a sufficient amount of heat, required to prevent product water from freezing, by itself in a short time without any external energy, thus improving cold start performance of a fuel cell vehicle at a temperature below zero.

2 Claims, 8 Drawing Sheets

FUEL CELL BIPOLAR PLATE AND METHOD FOR MANUFACTURING THE SAME

CROSS-REFERENCE TO RELATED APPLICATION

This application claims under 35 U.S.C. §119(a) the benefit of Korean Patent Application No. 10-2008-0056107 filed Jun. 16, 2008, the entire contents of which are incorporated herein by reference.

BACKGROUND (a) Technical Field

The present disclosure relates to a fuel cell bipolar plate and a method for manufacturing the same. More particularly, it relates to a fuel cell bipolar plate and a method for manufacturing the same, in which a carbon or metal fuel cell bipolar plate is preferably surface-treated with a complex transition metal oxide, which is a main component of a variable resistance heating element having a negative temperature, so that the bipolar plate can suitably ensure a sufficient amount of heat, required to prevent product water from freezing, by itself and in a short time and substantially without any external energy, thus improving the cold start performance of a fuel cell vehicle at a temperature below zero.

(b) Background Art

In a polymer electrolyte fuel cell, a fundamental component capable of generating electricity is a unit cell, which is defined as a separate electrical circuit comprising a polymer electrolyte membrane electrode assembly (MEA), a gas diffusion layer, and a bipolar plate (or separator).

As shown in FIG. 1, the unit cell preferably has a structure in which a bipolar plate 10a having a fuel flow field 50 and a bipolar plate 10b having an air flow field 60 are separated from each other by a polymer electrolyte membrane electrode assembly 30 and 40, and a gas diffusion layer 20 is preferably interposed between the bipolar plates 10 and 10b and the polymer electrolyte membrane electrode assembly 40, 30a and 30b, respectively, thus serving the function of diffusing reactant gases and serving as an electron transfer path.

The polymer electrolyte membrane electrode assembly 40, 30a and 30b located in the center of the unit cell is a component part preferably in the form of a thin film, in which carbon powder carrying platinum catalyst is suitably dispersed into a permeable membrane material, and has a structure in which a fuel electrode 30a and an air electrode 30b are bonded to both sides of a polymer electrolyte membrane 40, respectively.

The bipolar plates 10a and 10b located on the outside of the unit cell supply hydrogen and air required for an electrochemical reaction of the fuel cell to the polymer electrolyte membrane electrode assembly 40, 30a and 30b through the fuel and air flow fields 50 and 60, respectively, and at the same time serves as a conductor that connects an anode of the unit cell to a cathode thereof in series and as a structural support. Moreover, the bipolar plates 10a and 10b are generally formed of a carbon or metal material in terms of electrical conductivity and processability.

The operation principle of the fuel cell having the above-described configuration can be explained as electric current generation by the movement of free electrons due to the electrochemical reaction between hydrogen and oxygen.

Preferably, during operation of the polymer electrolyte fuel cell, an oxidation reaction, in which hydrogen is dissociated into hydrogen ions and free electrons, takes place in the fuel electrode 30a of the polymer electrolyte membrane electrode assembly, and a reduction reaction, in which the hydrogen ions transferred from the fuel electrode 30a to the air electrode 30b through the polymer electrolyte membrane 40 and the free electrons moving from the fuel electrode 30a to the air electrode 30b through an external circuit meet oxygen, takes place in the air electrode 30b. Accordingly, during the electrochemical reactions, electrical energy, gaseous or liquid water, and thermal energy are produced, which can be represented by the following formulas:

Fuel electrode (anode): $2H_2 \rightarrow 4H^+ + 4e^-$

Air electrode (cathode): $4H^+ + 4e^- + O_2 \rightarrow 2H_2O$

Overall reaction in the fuel cell:

$2H_2 + O_2 \rightarrow 2H_2O +$ electrical energy + heat energy

The electrical energy generated from the above overall reaction formula in the fuel cell is calculated from a difference between thermodynamic Gibbs free energy of water produced by the reaction and that of reactants such as hydrogen and oxygen in accordance with the following formula 1:

$$E = -\frac{\Delta \bar{g}_f}{2F} \, [V] \quad \text{[Formula 1]}$$

wherein E represents the equilibrium potential, F represents the Faraday constant, and $\bar{g}_f$ represents the thermodynamic Gibbs free energy in a standard state.

Preferably, if the reaction energy is all converted into electrical energy in the fuel cell, as seen from formula 1 the theoretical standard equilibrium potential of the fuel cell is approximately 1.2 V.

Suitably different from the ideal energy conversion process, thermal energy of about 40% to 50% of the required power is incidentally produced in the electrochemical reaction process of the actual fuel cell. If a voltage loss (overpotential) other than electrical energy is all converted into thermal energy in the electrochemical reaction process of the unit cell and, if applying an energy balance formula, accordingly the amount of heat can be quantitatively calculated from the following formula 2:

$$Q_{heat} = (V_{ideal} - V_{cell}) \times I_{cell} \times A_{rx} \, [W] \quad \text{[Formula 2]}$$

wherein Qheat represents the amount of heat due to a voltage loss, Icell represents a current density of a unit cell, Vcell represents the potential of a working electrode, Videal represents the ideal reversible potential, and Arx represents the electrode reaction area.

In general, when considering that the working electrode potential is preferably 0.6 to 0.7 V and the operational temperature is preferably 70 to 80° in the vehicle fuel cell, it can be seen that the amount of heat due to the difference between the ideal reversible potential and the working electrode potential is about 50% of the required power.

In order to control the amount of heat, the fuel cell has a structure in which heat is suitably removed by a coolant flowing through coolant supply channels 70 of the bipolar plates 30a and 30b provided per unit cell as shown in FIG. 1.

In particular, the vehicle fuel cell requires a power of several tens of kW and a voltage of several hundreds of V to drive a vehicle motor and, at the same time, the amount of heat due to the voltage loss of the fuel cell corresponds to 50% of the required output.

Accordingly, the vehicle fuel cell is preferably fabricated in the form of a stack in which several hundreds of unit cells including the bipolar plates having the coolant supply channels are preferably successively stacked.

Preferably, the polymer electrolyte membrane inserted into the center of each of the unit cells contains a sulfonic acid group, which is a functional group suitably capable of exchanging cations and, thus, if the polymer electrolyte membrane contains water, hydrogen ions can migrate through the polymer electrolyte membrane by hydration of the sulfonic acid group.

Accordingly, if the polymer electrolyte membrane loses water and becomes dry, the hydration of the sulfonic acid group does not occur. As a result, the hydrogen ion transfer resistance is suitably reduced, and thereby the performance of the fuel cell stack is deteriorated.

For example, when the fuel cell vehicle is initially started at a temperature below zero, the water content of the polymer electrolyte membrane is as low as 3 to 5% compared to the water content at normal temperature. Accordingly, the performance of the vehicle fuel cell is considerably reduced by a sudden increase in hydrogen ion transfer resistance.

Further, in the case where the fuel cell stack is operated at a temperature below zero, the water produced by the electrochemical reaction in the fuel cell freezes in the polymer electrolyte membrane electrode assembly, the gas diffusion layer, etc., and thereby the transfer of the reactant gases is hindered, which results in a reduction in power density of the fuel cell stack.

Accordingly, in the case where the fuel cell vehicle is initially started at a temperature below freezing point, the start-up time is suitably delayed until the rated power is reached due to the low power density of the fuel cell stack.

In order to develop techniques to put the fuel cell vehicles to practical use, it is preferable to develop a technique or method for improving cold start performance of the fuel cell vehicle, preferably in which a level of close to about 50% of the rated power can be reached within about 30 seconds, preferably with a minimum energy of less than about 5 MJ during the initial start-up of the fuel cell vehicle at a temperature of −20° C.

Preferably, in order to stably operate the fuel cell system at a temperature below freezing point, it is necessary to develop a technique or method for coping with the freezing problem, which can suitably improve the cold start performance, prevent water in the fuel cell stack from freezing, and reduce the cold start time during the development of the fuel cell vehicle.

Accordingly, a technical method, in which an instantaneous heat load is applied to the fuel cell system so that the fuel cell stack reaches its normal operational temperature range within a very short time, may be suitably employed. Preferably, the thermal energy required to prevent product water in the fuel cell from freezing can be calculated by the following formula 3:

$$Q_{required} = Q_{latent} + Q_{sensible} = \dot{m}_p^w H_{fusion} + \dot{m}_p^w c_p \Delta T [W] \quad \text{[Formula 3]}$$

wherein Qrequired represents the thermal energy required to improve cold start performance, Qlatent represents the latent heat accompanying a phase change, Qsensible represents the sensible heat accompanying a temperature change without a phase change, and ΔT represents the difference between the external temperature and the internal temperature.

$H_{fusion}$ represents the heat of fusion required to convert ice into liquid water, i.e., thermal energy of 333.6 J/g, and $\dot{m}_p^w$ represents the mass flow rate of water produced in the fuel cell by the electrochemical reaction and can be calculated from the following formula 4:

$$\dot{m}_p^w = \left(\frac{I_{cell}}{2F}\right) \cdot MW_{H2O} \quad \text{[Formula 4]}$$

wherein $MW_{H2O}$ represents the molecular weight of water.

Preferably, according to the conventional techniques, an external heating element is additionally provided in the fuel cell to supply thermal energy required during the initial start-up of the fuel cell vehicle at a temperature below freezing point, or high temperature coolant is circulated until the fuel cell stack reaches the appropriate temperature range.

The above conventional techniques supply external energy by the use of external equipment, and so the size and complexity of the fuel cell system are increased to deteriorate the efficiency of the overall system, and the time required for the fuel cell stack to reach its normal operational temperature range is increased, which increases the cold start time.

Accordingly, the cold start problem of the fuel cell vehicle is directly linked to the improvement of the durability of the fuel cell stack, and it is necessary to provide an alternative approach to overcome the current technical limitations in order to put the fuel cell vehicles to practical use.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a fuel cell bipolar plate and a method for manufacturing the same, in which a carbon or metal fuel cell bipolar plate is preferably surface-treated with a complex transition metal oxide, which is a temperature-dependent variable resistance heating element having a suitably high resistance at a low temperature and a suitably low resistance at a high temperature, so that the bipolar plate can ensure a sufficient amount of heat, required to prevent product water from freezing, by itself in a short time without any external equipment and external energy, thus improving cold start performance of a fuel cell vehicle preferably at a temperature below zero. In preferred embodiments, the present invention provides a fuel cell bipolar plate and a method for manufacturing the same, in which a transition metal or any metal is preferably added to a variable resistance complex transition metal oxide to suitably improve the acid resistance of a carbon or metal bipolar plate, thus improving the durability of the fuel cell bipolar plate.

In one aspect, the present invention provides a fuel cell bipolar plate, characterized in that a carbon or metal fuel cell bipolar plate is suitably surface-treated with a negative temperature coefficient (NTC) or critical temperature resistance (CTR) complex transition metal oxide, which is a temperature-dependent variable resistance heating element having a suitably high resistance at a low temperature and a suitably low resistance at a high temperature.

In a preferred embodiment, the NTC complex transition metal oxide is prepared by mixing two to four kinds of metal oxides such as, but not limited to, tungsten, molybdenum, niobium, etc. of groups 3 to 12 of the periodic table, molding the mixture, and sintering the molded material at high temperature.

In another preferred embodiment, the CTR complex transition metal oxide preferably comprises vanadium oxide (VO$_2$) as a main component and is preferably prepared by adding phosphorus pentachloride (P$_2$O$_5$) and strontium oxide (SrO) to vanadium pentoxide (V$_2$O$_5$), a kind of vanadium oxide, and suitably sintering the mixture in a reduction atmosphere.

In another aspect the present invention provides a method for manufacturing a fuel cell bipolar plate, the method preferably comprising preparing a negative temperature coefficient (NTC) complex transition metal oxide, which is a variable resistance heating element with a negative temperature characteristic, in which electrical resistance is exponentially decreased in a wide temperature range; preparing a critical temperature resistance (CTR) complex transition metal oxide, which is a variable resistance heating element with a negative temperature characteristic, in which the electrical resistance is considerably reduced by a change in crystal structure above a certain temperature; forming a complex transition metal oxide layer on the surface of the bipolar plate by suitably surface-treating the bipolar plate with the NTC or CTR complex transition metal oxide; heat-treating the surface-treated bipolar plate; and measuring the degree of change in the electrical resistance caused by various temperature changes of the complex transition metal oxide layer in order to quantitatively calculate self-heating energy that the complex transition metal oxide layer on the bipolar plate has.

In another preferred embodiment, a small amount of at least one metal element selected from the group consisting of, but not limited to, tungsten, molybdenum, niobium, nickel, germanium, and the like, or a small amount of at least one transition metal oxide selected from the group consisting of VO, $V_2O_3$, $V_6O_{13}$, $Ti_2O_3$, and the like is added to the CTR complex transition metal oxide to control its phase transition temperature and electrical resistance change range, thus suitably changing the crystal structure thereof.

In another preferred embodiment, the process of forming the complex transition metal oxide layer on the surface of the bipolar plate is suitably performed by a method selected from the group consisting of, but not limited to, chemical vapor deposition, atomic layer deposition, sputtering, pulsed laser deposition, sol-gel, and the like.

In still another preferred embodiment, the surface-treated bipolar plate is suitably dried at room temperature and atmospheric pressure and then heat-treated in a low oxygen partial pressure atmosphere.

In yet another preferred embodiment, the method of the present invention further comprises controlling the thickness of the complex transition metal oxide layer on the surface of the bipolar plate in order to satisfy an electrical resistance limit value that preferably coincides with the self-heating energy required by the electrical resistance of the complex transition metal oxide layer.

In still yet another preferred embodiment, the process of controlling the thickness of the complex transition metal oxide layer comprises: determining a suitable minimum current density required to prevent product water in a fuel cell from freezing by calculating the amount of heat required to prevent water, produced by an electrochemical reaction in the fuel cell, from freezing and the amount of heat generated by ohmic resistance; and suitably obtaining a limit value of the electrical resistance required to supplement insufficient thermal energy from self-heating energy generated by the electrical resistance of the complex transition metal oxide that constitutes the complex transition metal oxide layer of the bipolar plate, in the case where the amount of heat due to the ohmic resistance in the fuel cell is suitably insufficient to provide the thermal energy required to prevent product water from freezing.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
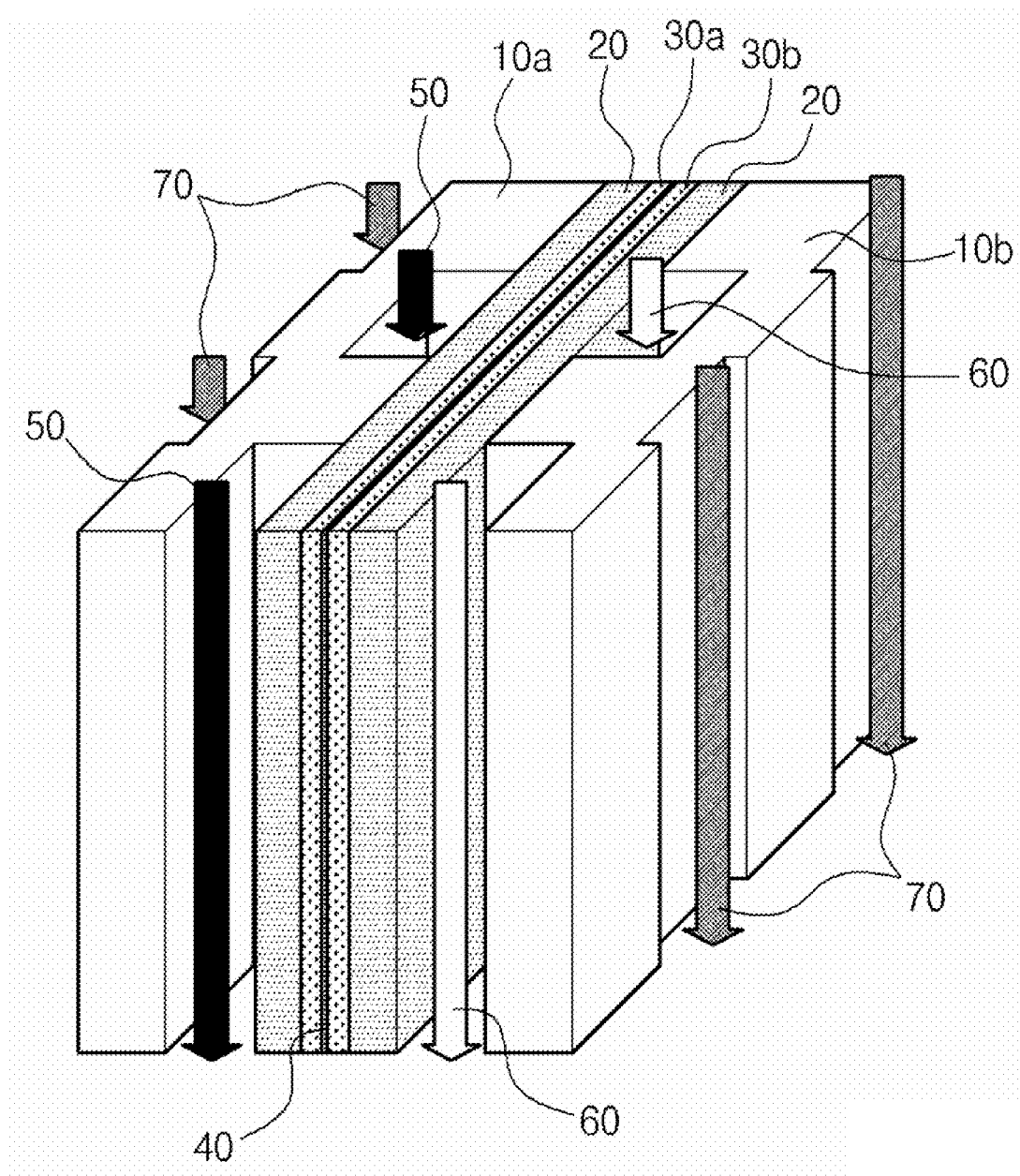
FIG. 1 is a schematic diagram showing a structure of a polymer electrolyte fuel cell and showing the flow of a working fluid.

Reference numerals set forth in the Drawings includes reference to the following elements as further discussed below:

| | |
|---|---|
| 10a and 10b: bipolar plate | 20: gas diffusion layer |
| 30a: fuel electrode | 30b: air electrode |
| 40: polymer electrolyte membrane | 50: fuel flow field |
| 60: air flow field | 70: coolant supply channel |
| 80: variable resistance complex transition metal oxide (layer) | |
| 90a: heat transfer direction | 90b: self-heating energy |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

In a first aspect, the invention features a fuel cell bipolar plate, characterized in that a carbon or metal fuel cell bipolar plate is surface-treated with a transition metal oxide, which is a temperature-dependent variable resistance heating element having a high resistance at a low temperature and a low resistance at a high temperature.

In one embodiment, the transition metal oxide is a negative temperature coefficient (NTC) complex transition metal oxide.

In another embodiment, the transition metal oxide is a critical temperature resistance (CTR) complex transition metal oxide.

In another aspect, the invention features a method for manufacturing a fuel cell bipolar plate, the method comprising preparing a one or more complex transition metal oxides, forming a complex transition metal oxide layer on the surface of the bipolar plate by surface-treating the bipolar plate with the one or more complex transition metal oxides, heat-treating the surface-treated bipolar plate; and measuring the degree of change in the electrical resistance caused by temperature changes of the complex transition metal oxide layer.

In one embodiment, the method further comprises the step of quantitatively calculating the self-heating energy of the complex transition metal oxide layer of the bipolar plate.

In another embodiment, the one or more complex transition metals is a negative temperature coefficient (NTC) complex transition metal oxide, which is a variable resistance heating element with a negative temperature characteristic, in which electrical resistance is exponentially decreased in a wide temperature range.

In another embodiment, the one or more complex transition metal is a critical temperature resistance (CTR) complex transition metal oxide, which is a variable resistance heating element with a negative temperature characteristic, in which the electrical resistance is greatly reduced by a change in crystal structure above a certain temperature.

The invention also features a motor vehicle comprising the fuel cell bipolar plate as described by any of the aspects set forth herein.

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention aims at improving cold start performance of a fuel cell vehicle by preferably surface-treating a bipolar plate with a transition metal oxide, which is a main component of a variable resistance heating element having a negative temperature characteristic, so as to ensure a sufficient amount of heat required during start-up of a vehicle fuel cell at suitably low temperature and to realize a rapid temperature rise.

Preferably, the present invention has a characteristic feature in that a fuel cell bipolar plate is suitably surface-treated with an NTC complex transition metal oxide, which is a variable resistance heating element with a negative temperature characteristic, in which electrical resistance is preferably exponentially decreased in a wide temperature range, or with a CTR complex transition metal oxide, which is a variable resistance heating element with a negative temperature characteristic, in which the electrical resistance is considerably reduced by a change in crystal structure (phase transition) above a certain temperature, so that a vehicle fuel cell can ensure a sufficient amount of heat required during start-up at low temperature, thus improving cold start performance of a fuel cell vehicle.

For this purpose, the present invention selects a suitable transition metal oxide such as, but not limited to, tungsten, molybdenum, niobium, etc. from groups 3 to 12 of the periodic table, which are preferably used as a material for an electrical conductive ceramic semiconductor, as a basic material, mixes two to four kinds of transition metal oxides such as, but not limited to, tungsten, molybdenum, niobium, etc. from groups 3 to 12 of the periodic table, molds the mixture, and sinters the molded material at high temperature, thus preparing a complex transition metal oxide having a negative temperature characteristic having various electrovalences during ionization.

In further embodiments, the complex transition metal oxide preferably prepared according to embodiments described herein, has the material properties of a temperature sensitive resistance element, in which the resistance is suddenly changed even by a small change in temperature, and the physical properties of an NTC thermistor with a negative temperature characteristic, in which the resistance is exponentially decreased by a temperature rise.

In further related embodiments, the CTR complex transition metal oxide formed preferably of vanadium oxide ($VO_2$) as a main component basically has the same properties as the NTC thermistor; however, since it has the physical properties in which the electrical resistance is suddenly reduced in a certain temperature range, it is suitably called a critical temperature thermistor.

In other embodiments of the invention, since a single crystal of the vanadium oxide ($VO_2$) in a pure state has poor physical properties, a ceramization process, preferably in which phosphorus pentachloride (P2O5) and strontium oxide (SrO) are added to vanadium pentoxide ($V_2O_5$), a kind of vanadium oxide, and the mixture is sintered in a reduction atmosphere, is preferably mainly employed.

In related embodiments, since the vanadium oxide that has been subjected to the above process is preferably surrounded with oxides in a glassy state, the poor physical properties of the vanadium oxide single crystal are suitably improved, and thereby it has the material properties of a typical CRT thermistor having excellent corrosion resistance and chemical durability.

In preferred embodiments of the present invention, in order to control the resistance change temperature and the resistance change range of the above NTC or CTR complex transition metal oxide to meet the operational range of the fuel cell vehicle, in certain preferred embodiments, a metal element of groups 1 to 2 of the periodic table or a transition metal of groups 3 to 12 of the periodic table is added to the complex transition metal oxide.

Preferably, in the case where a complex transition metal oxide layer is suitably formed on the surface of the bipolar plate by adding the metal element to the complex transition metal oxide in the above manner, the electrical conduction mechanism of the existing complex transition metal oxide is changed, and thereby, in further related embodiments, a change in electrical resistance with a change in temperature and a change in critical temperature (phase transition temperature) will preferably inevitably occur.

In exemplary embodiments, the vanadium oxide ($VO_2$) preferably used as a main material of the CTR complex transition metal oxide shows characteristics that the resistance is suitably rapidly reduced to a level of 1/100 starting from a temperature of 68° C. in a pure state where any metal element is not added, which means that the crystal structure of the vanadium oxide ($VO_2$) is suitably changed (phase transition) from a monoclinic structure having the property of an insulator to a tetragonal structure having the property of a metal, which suitably activates hopping of electrons, and thereby the electrical resistance is rapidly reduced.

Accordingly, in related embodiments, in order to control the phase transition temperature and the electrical resistance change range of the CTR complex transition metal oxide, it is preferably necessary to change the crystal structure by adding a small amount of a metal element such as, but not limited to, tungsten, molybdenum, niobium, nickel, germanium, etc., or a transition metal oxide such as VO, $V_2O_3$, $V_6O_{13}$, $Ti_2O_3$, etc. to a ceramics material during the ceramization process of the vanadium oxide.

Preferably, the crystal structure of the vanadium oxide, to which a small amount of a metal element is added, is suitably determined by a difference between the ionic radius of vanadium ion ($V^{5+}$) and the ionic radius of the added metal element and, at this time, the physicochemical properties of the final compound are suitably changed according to the kind of the added metal element.

For example, in certain embodiments, in the case where a small amount of molybdenum is added to the vanadium oxide, since the ionic radius (0.62 Å) of molybdenum ion ($Mo^{6+}$) and the ionic radius (0.5 Å) of vanadium ion ($V^{5+}$) are about the same, the vanadium oxide, to which molybdenum is added, has a crystal structure similar to that of the vanadium oxide, to which molybdenum is not added.

Accordingly, since the crystal structure is stably maintained even during the electrochemical reaction, the vanadium oxide to which a small amount of molybdenum is added has an advantage in that the durability of the electrode is suitably improved, compared to the pure vanadium oxide. In related embodiments, if a small amount of molybdenum is preferably added to the vanadium oxide, it is possible to overcome the low electrical conductivity and a closed reversible cycle of vanadium oxide. Accordingly, in further related embodiments, for example in the case where the added content of molybdenum is determined using the above characteristics, it is possible to preferably prepare a CTR complex transition metal oxide having the properties satisfying the operational temperature range of the fuel cell vehicle.

In preferred embodiments of the invention, the content of the metal element added to the complex transition metal oxide should be suitably determined so that the phase transition temperature of the complex transition metal oxide, to which the metal element is added, and the electrical resistance change range preferably meet the overall operational temperature range of the fuel cell vehicle including the cold start.

Accordingly, the present invention suitably controls the added content of the metal element of the complex transition metal oxide in order to adjust the electrical resistance change and the electrical resistance change temperature of the complex transition metal oxide layer on the bipolar plate and, at the same time, suitably minimizes the amount of heat and contact resistance due to the electrical resistance by varying the process conditions and controlling the thickness and microstructure of the surface-treated bipolar plate during the surface treatment of the bipolar plate.

Moreover, according to further embodiments of the invention as described herein, in order to determine a limit value of the electrical resistance required in selecting the material of the complex transition metal oxide of the bipolar plate in accordance with preferred embodiments of the present invention, the thermal balance relation under cold start conditions of the fuel cell is preferably used. For example, in exemplary embodiments, assuming that the current density, required in the fuel cell having a reaction area of 300 $cm^2$ at a temperature of $-20°$ C., is preferably 300 $mA/cm^2$, the amount of heat required to prevent water, produced in the fuel cell by the electrochemical reaction, from freezing can be calculated from the following formula 5:

$$Q_{required} = Q_{latent} + Q_{sensible} \quad \text{[Formula 5]}$$
$$\left(\frac{I_{cell}}{2F}\right)MW_{H2O}H_{fusion} + \left(\frac{I_{cell}}{2F}\right)c_p\Delta T[W]$$

Thus, according to exemplary embodiments, it can be seen from formula 5 that, assuming that the water produced by the electrochemical reaction is preferably present in the form of a liquid phase in the case where the internal temperature of the fuel cell is 0° C., that is, assuming that $\Delta T$ representing the difference between the external temperature of $-20°$ C. and the internal temperature of the fuel cell is 20° C., the amount of heat required to prevent product water from freezing is calculated to about 3 W.

Since the water content of the polymer electrolyte membrane is as low as about 3 to 5% (molar concentration less than about 1.0 $mol/m^3$), compared to the water content at normal temperature, in the case where the fuel cell is initially driven at a temperature below zero, the overpotential determines the overall performance of fuel cell.

Overpotential is a phenomenon caused by a reduction in hydrogen ion conductivity due to the low water content of the polymer electrolyte membrane and, as a result, inducing an increase in the ohmic resistance to deteriorate the performance of the fuel cell. According to further preferred embodiments of the invention, the overpotential due to the ohmic resistance is converted into thermal energy and can be calculated quantitatively from the following formula 6:

$$Q_{ohmic} = RI_{crit}^2 A r x \quad \text{[Formula 6]}$$

wherein Qohmic represents the thermal energy produced by the ohmic resistance, $I_{crit}$ represents the critical current density, a maximum current value enabling the fuel cell to normally operate, and R represents the ohmic resistance.

A minimum current density required to prevent product water in the fuel cell from freezing can be suitably determined from the amount of heat, calculated in the above manner and required to prevent water produced by the electrochemical reaction from freezing, and the amount of heat generated by the ohmic resistance.

Accordingly, in order to prevent product water from freezing without the use of any heater under cold start conditions, the amount of heat generated by the ohmic resistance should be larger than the amount of heat required to prevent product water from freezing as follows.

$$Q_{required} \leq Q_{ohmic}$$

For example, assuming that the electrical resistance in the bipolar plate and the gas diffusion layer is ignored, the resistance of the polymer electrolyte membrane electrode assembly can be calculated from the polarization curve of the fuel cell.

From this, if the critical current density, required in the fuel cell having a reaction area of 300 cm$^2$ under cold start conditions of −20° C., is calculated, it has a value of about 275 mA/cm$^2$, which means that it is possible to prevent product water from freezing using the thermal energy by the ohmic resistance without the aid of any heater in the case where the current density, required in the fuel cell having a reaction area of 300 cm$^2$ at a temperature of −20° C., is 300 mA/cm$^2$.

Accordingly, in preferred embodiments, the present invention suitably determines the conditions that should satisfy the amount of heat required to prevent product water from freezing by the additional heater, i.e., the limit value of the electrical resistance of the complex transition metal oxide layer on the bipolar plate with respect to the current density having a value smaller than the critical current density of 275 mA/cm$^2$ under cold start conditions.

According to preferred embodiments, assuming that the current density, required during the initial start-up of the fuel cell having a reaction area of 300 cm$^2$ at a temperature of −20° C., is 300 mA/cm$^2$, the critical current density calculated in the same manner as described above has a value of about 160 mA/cm$^2$, which means that it is necessary to supplement the insufficient thermal energy using the additional heater since the amount of heat due to the ohmic resistance in the fuel cell is insufficient to provide the thermal energy required to prevent product water from freezing.

The limit value of the electrical resistance required to supplement the insufficient thermal energy from the self-heating energy generated by the electrical resistance of the complex transition metal oxide layer on the bipolar plate can be calculated from the thermal balance relation expressed as the following formula 7:

$$Q_{BP} \geq Q_{latent} + Q_{sensible} - Q_{ohmic} \quad \text{[Formula 7]}$$

wherein $Q_{BP}$ represents the self-heating energy generated by the electrical resistance of the complex transition metal oxide layer on the bipolar plate, which has a value about 1.5 to 2 times larger than the amount of heat generated by the ohmic resistance of the polymer electrolyte membrane under cold start conditions.

From this, in the case where the current density, required in the fuel cell having a reaction area of 300 cm$^2$ at a temperature of −20° C., is 100 mA/cm$^2$, if the internal resistance of the complex transition metal oxide layer on the bipolar plate, required to prevent product water from freezing, is calculated, a value of about 0.001 Ω can be obtained.

Accordingly, in further embodiments, assuming that the thickness of the complex transition metal oxide layer on the surface of the bipolar plate is preferably 10 μm under the above conditions, it is possible to draw a conclusion that it is necessary to select and use a variable resistance material preferably having a specific resistance limit value of 200 Ω in order to supplement the insufficient thermal energy required to prevent product water in the fuel cell from freezing within the cold start temperature range.

According to further preferred embodiments, if the specific resistance value of the NTC or CTR variable resistance complex transition metal oxide is proposed against the cold start temperature range, it is possible to obtain a quantitative result for the thickness of the complex transition metal oxide layer on the fuel cell bipolar plate by reversely applying the above described method.

Accordingly, the method of estimating the amount of heat required to suitably prevent product water in the fuel cell from freezing within the cold start temperature range during the initial start-up of the fuel cell, the method of obtaining the specific resistance limit value of the complex transition metal oxide, the method of selecting the complex transition metal oxide and the metal element added thereto, and the method of controlling the electrical resistance by controlling the thickness and microstructure of the complex transition metal oxide layer on the bipolar plate are all suitably proposed by the present invention, and thus the present invention includes a series of methods for surface-treating the bipolar plate with the NTC or CTR complex transition metal oxide, which is a temperature-dependent variable resistance heating element.

According to preferred embodiments of the invention as described herein, the metal oxide layer, a temperature-dependent variable resistance heating element of the bipolar plate prepared by the above methods, suitably supplements the energy required to prevent product water in the fuel cell from freezing and improves the electrode reaction rate without any external energy by producing self-heating due to a high electrical resistance in the cold start temperature range of the fuel cell vehicle.

Accordingly, in the case where the technique in accordance with the present invention is applied to the fuel cell vehicle, it is possible to suitably reduce the cold start time of the fuel cell vehicle and, at the same time, improve the efficiency of the fuel cell system.

For a better understanding of the present invention that provides the fuel cell bipolar plate surface-treated with the complex transition metal oxide in order to improve cold start performance will be described in more detail with reference to the accompanying drawings.

FIG. 1 is an exemplary schematic diagram showing the internal structure of a unit cell in a typical polymer electrolyte fuel cell according to preferred embodiments of the present invention.

As described above, the unit cell preferably has a structure in which a bipolar plate 10a having a fuel flow field 50 and a bipolar plate 10b having an air flow field 60 are suitably separated from each other by a polymer electrolyte membrane electrode assembly 30 and 40, and a gas diffusion layer 20 is preferably interposed between the bipolar plates 10 and 10b and the polymer electrolyte membrane electrode assembly 40, 30a and 30b, respectively, thus serving the function of diffusing reactant gases and serving as an electron transfer path.

In certain preferred embodiments, the polymer electrolyte membrane electrode assembly 40, 30a and 30b located in the center of the unit cell is a component part in the form of a thin film, in which carbon powder carrying platinum catalyst is preferably dispersed into a permeable membrane material, and has a structure in which a fuel electrode 30a and an air electrode 30b are bonded to both sides of a polymer electrolyte membrane 40, respectively.

In other embodiments, the bipolar plates 10a and 10b located on the outside of the unit cell supply hydrogen and air required for the electrochemical reaction of the fuel cell to the polymer electrolyte membrane electrode assembly 40, 30a and 30b through the fuel and air flow fields 50 and 60, respectively, and at the same time serves as a conductor that connects an anode of the unit cell to a cathode thereof in series and as a structural support. Preferably, according to further embodiments, the bipolar plates 10a and 10b are generally formed of a carbon or metal material in terms of electrical conductivity and processability.

Figure 2:
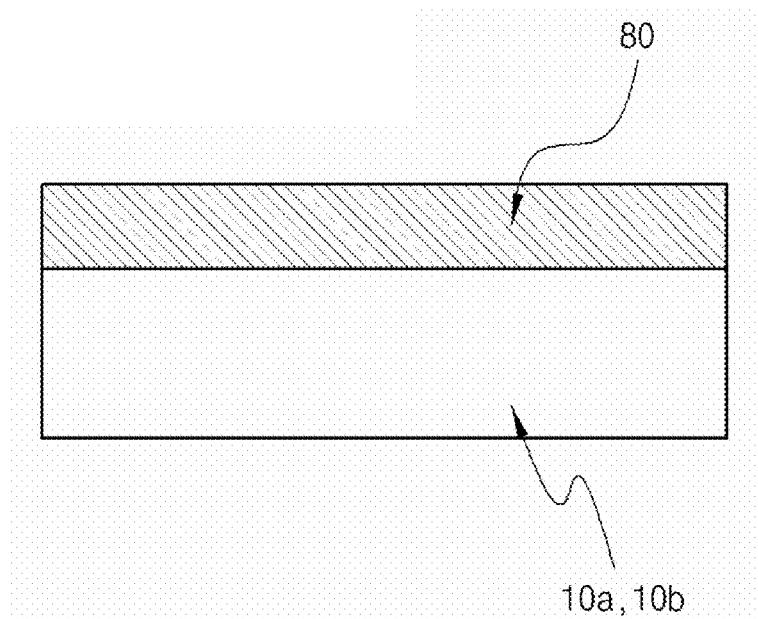
FIG. 2 is a schematic diagram showing a cross section of a bipolar plate surface-treated with a variable resistance complex transition metal oxide in accordance with the present invention.

FIG. 2 is a schematic diagram showing an exemplary cross section of the carbon or metal bipolar plate surface-treated with a variable resistance complex transition metal oxide 80 in accordance with the present invention.

Preferably, the variable resistance complex transition metal oxide 80 coated on the surface of the bipolar plates 10a and 10b has the physical properties of the negative temperature coefficient (NTC) or critical temperature resistance (CTR) thermistor, a temperature-dependent variable resistance heating element having a high resistance at a low temperature and a low resistance at a high temperature.

Figure 3:
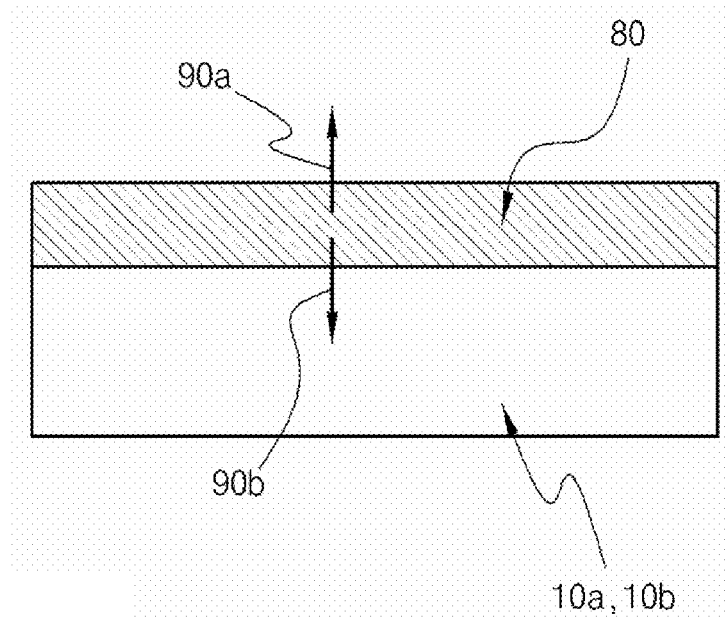
FIG. 3 is a schematic diagram showing heat generation and heat flow with respect to the cross section of the bipolar plate of FIG. 2.

FIG. 3 is an exemplary schematic diagram showing heat generation and heat flow with respect to the cross section of the bipolar plate surface-treated with the variable resistance complex transition metal oxide 80 of FIG. 2.

Preferably, since the complex transition metal oxide layer 80 treated with the NTC or CTR complex transition metal oxide is composed of an NTC thermistor material, in which the resistance is reduced by the temperature increase, it is similar to a semiconductor, and thereby the high electrical resistance of the complex transition metal oxide layer 80 formed on the surface of the bipolar plate induces self-heating when current flows in the vehicle fuel cell by applying an external voltage at low temperature during the initial start-up of the fuel cell, thus supplementing the amount of heat required to prevent product water in the fuel cell from freezing by itself. As a result, the vehicle fuel cell can enter the normal operational temperature range in a short time.

Preferably, the self-heating energy by the variable resistance complex transition metal oxide layer 80 is suitably transferred through working fluids (hydrogen, air and water) flowing through the respective flow fields of the adjacent bipolar plates 10a and 10b.

Accordingly, in preferred embodiments, since the self-heating energy of the variable resistance complex transition metal oxide layer 80 is transferred through various channels by conductive heat transfer 90a through the bipolar plates 10a and 10b or by convective heat transfer 90a through adjacent working fluids in the fuel cell, it suitably enables the fuel cell stack to quickly reach the normal operational temperature range.

According to further preferred embodiments, since the electrical resistance of the complex transition metal oxide layer 80 formed on the surface of the bipolar plates 10a and 10b is greatly reduced as the temperature of the vehicle fuel cell rises rapidly, the electrical resistance becomes relatively low at the time point when the fuel cell stack enters the normal operational temperature range, thus showing the output characteristics of the typical fuel cell stack.

Accordingly, it is possible to suitably ensure a sufficient amount of heat required for the fuel cell vehicle driven at a low temperature below freezing point to reach the normal operational temperature range (60 to 80° C.) in a short time, thus reducing the cold start time of the fuel cell vehicle.

Figure 4A:
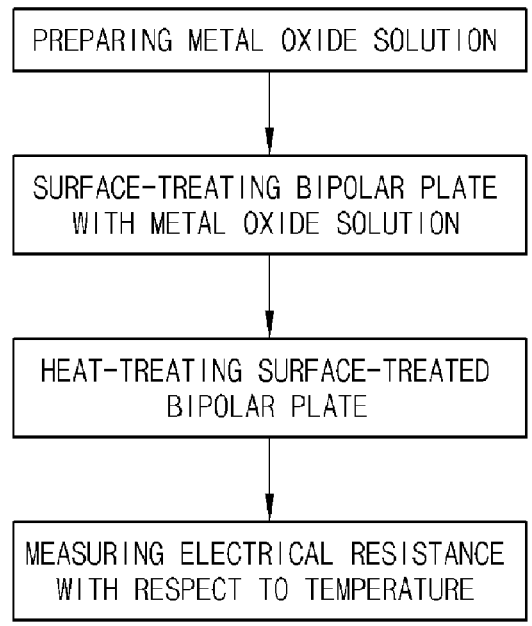
FIG. 4A is a flowchart showing a method for manufacturing a fuel cell bipolar plate in accordance with the present invention.

FIG. 4A is an exemplary flowchart schematically showing a series of processes for measuring a change in electrical resistance caused by the temperature of the variable resistance complex transition metal oxide layer in accordance with preferred embodiments of the present invention.

In one embodiment, first, a metal oxide solution is prepared by mixing a transition metal oxide having the physical properties of the variable resistance heating element with a metal element for controlling the phase transition temperature and the electrical resistance change range for the overall operational temperature range of the fuel cell including the cold start conditions, and the thus prepared metal oxide solution is applied to the surface of the carbon or metal bipolar plates 10a and 10b.

Preferably, it is necessary to perform the process of controlling the thickness of the complex transition metal oxide layer 80 of the bipolar plate in order to satisfy the electrical resistance limit valve that coincides with the self-heating energy required by the electrical resistance of the complex transition metal oxide layer 80.

In further related embodiments, the bipolar plate surface-treated with the metal oxide solution is subjected to a heat treatment process, and then the degree of change in electrical resistance due to the temperature change is suitably measured.

Accordingly, in related embodiments, the self-heating energy 90b (see FIG. 3) of the complex transition metal oxide layer 80 can be quantitatively calculated against the respective temperature ranges based on the change in the electrical resistance.

Figure 4B:
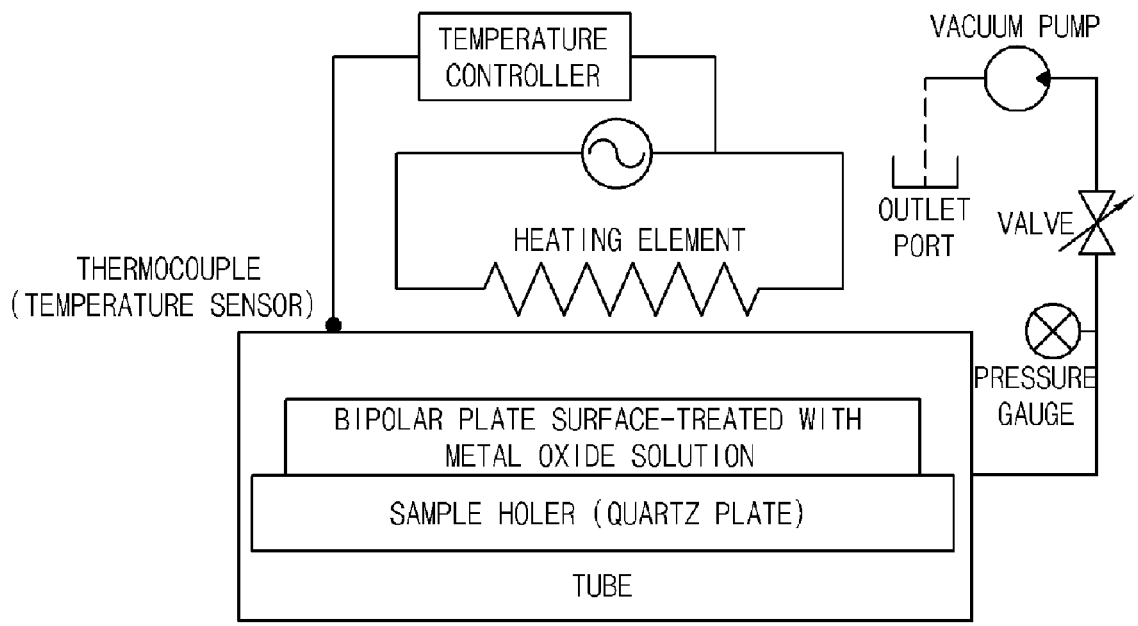
FIG. 4B is a schematic diagram showing an apparatus for heat treatment of a complex transition metal oxide layer in accordance with the present invention.

FIG. 4B is an exemplary schematic diagram showing an apparatus for heat treatment of the complex transition metal oxide layer 80 of FIG. 4A.

Since an ambient oxygen partial pressure may cause a change in the physical properties of the complex transition metal oxide layer during the heat treatment, in certain preferred embodiments, an apparatus for producing a low oxygen partial pressure atmosphere during the process is suitably required.

Accordingly, in further preferred embodiments of the present invention, a vacuum pump is provided in the heat treatment apparatus to produce a low oxygen partial pressure atmosphere around the bipolar plate surface-treated with the metal oxide solution.

Figure 7A:
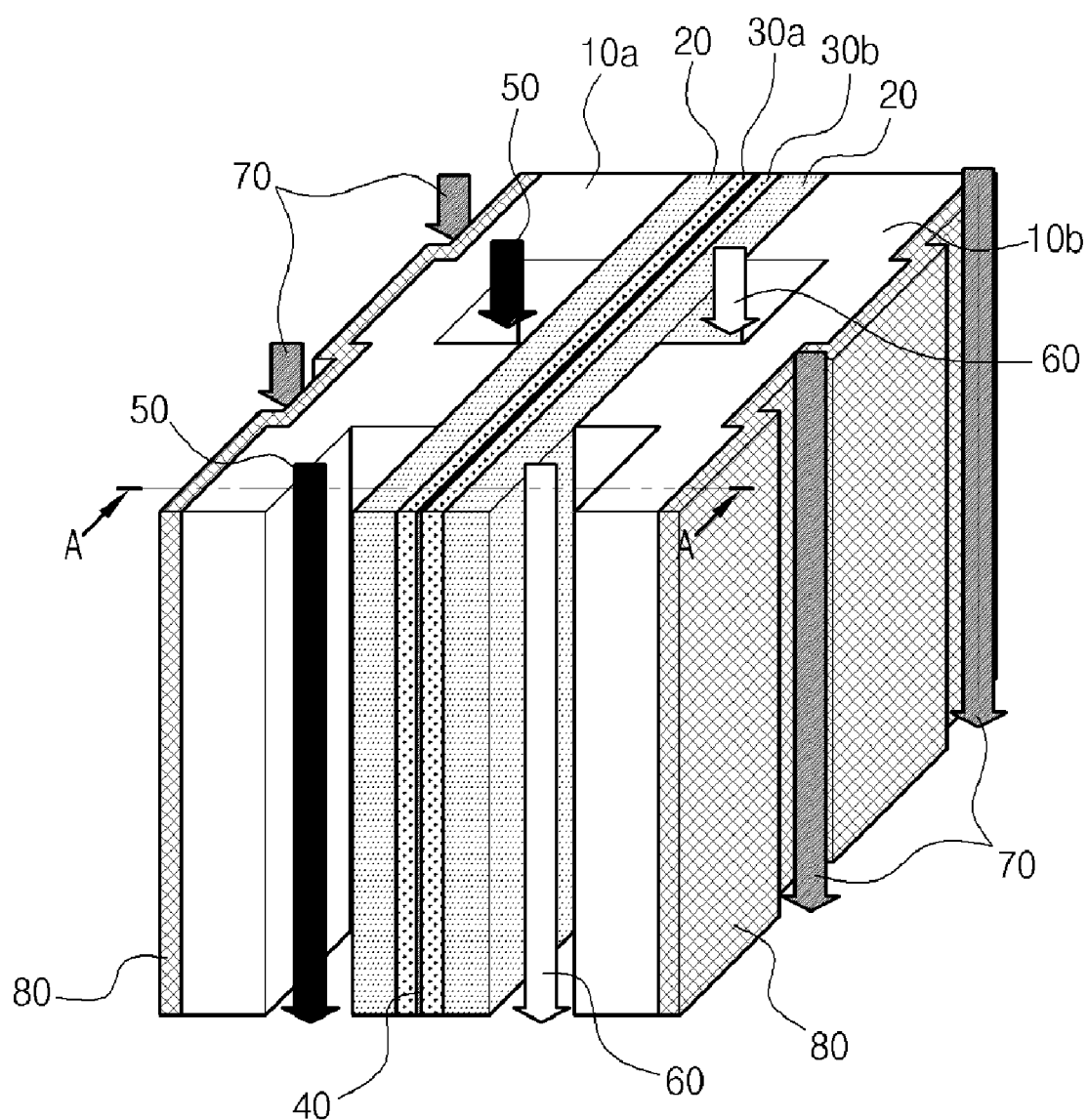
FIGS. 7A and 7B are conceptual diagrams showing a method of surface-treating a coolant supply bipolar plate with a variable resistance complex transition metal oxide as part of a strategy for overcoming the acid resistance in accordance with the present invention.
Figure 7B:
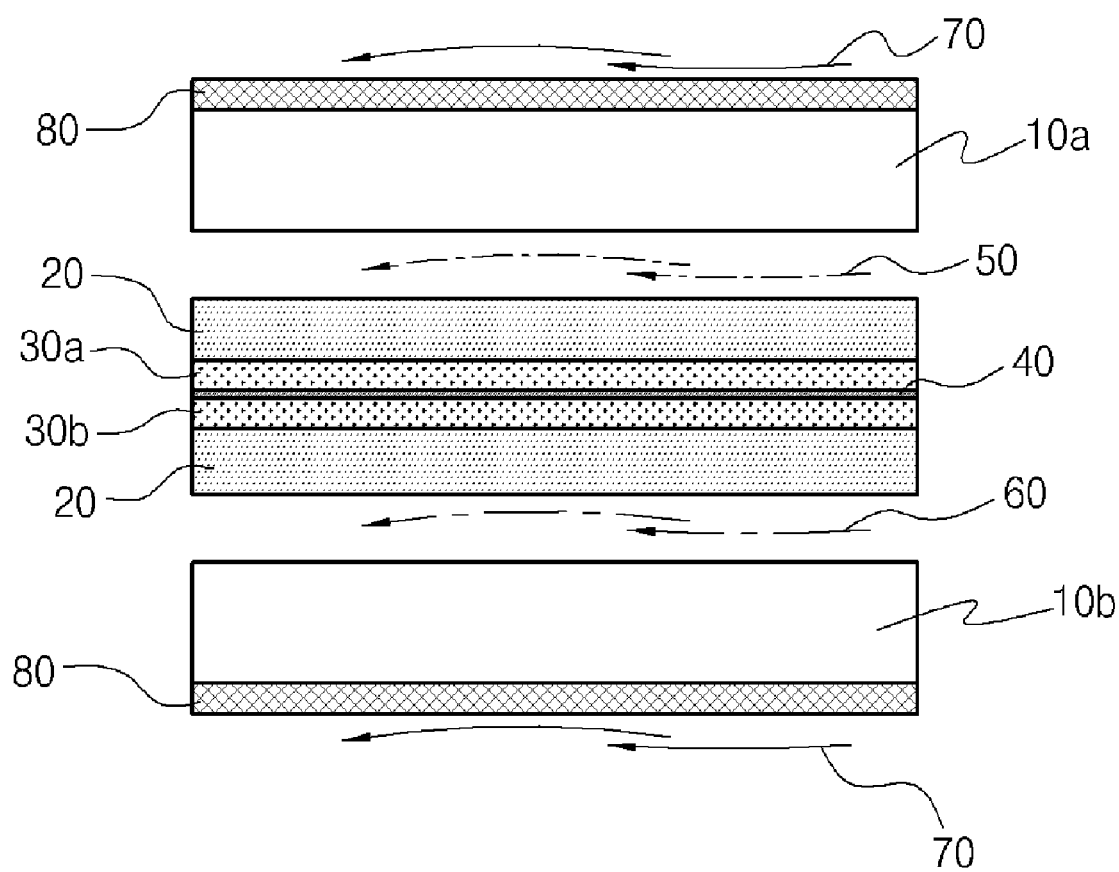

FIGS. 7A and 7B are exemplary conceptual diagrams showing a preferred method of surface-treating a coolant supply bipolar plate with a variable resistance complex transition metal oxide as part of a strategy for overcoming the acid resistance in accordance with preferred embodiments of the present invention.

Since there may occur problems such as surface corrosion of the bipolar plate and transition metal loss due to a relatively strong acid atmosphere of the fuel cell, the present invention proposes a method of suitably applying the variable resistance complex transition metal oxide 80 to the surface of a coolant supply channel 70 as part of a strategy for solving the above problems.

Preferably, the present invention provides an advantageous effect of preventing the variable resistance complex transition metal oxide from being exposed to the strong acid atmosphere in the fuel cell and thereby suitably overcomes surface corrosion of the bipolar plate and transition metal loss.

EXAMPLES

The following examples illustrate the invention and are not intended to limit the same.

As described above, the present invention has a characteristic feature in that, so that the bipolar plate can ensure a sufficient amount of heat, required to prevent product water in the fuel cell from freezing, by itself in a short time, in the case where the fuel cell is driven in the cold start temperature range of the fuel cell vehicle, the bipolar plate is surface-treated with a transition metal oxide, which is a main component of the variable resistance heating element having a negative temperature characteristic, to improve cold start performance of the fuel cell vehicle, and thus the present invention includes a series of methods related thereto.

In the examples performed to examine the applicability of the technique in accordance with the present invention, the critical temperature resistance (CTR) thermistor formed mainly of vanadium oxide ($VO_2$) among various transition metal oxides was applied to a carbon fuel cell bipolar plate.

Although there are various methods of forming a vanadium oxide layer on the surface of the fuel cell bipolar plate, such as chemical vapor deposition, atomic layer deposition, sputtering, pulsed laser deposition, sol-gel, etc., in the examples of the present invention, the vanadium oxide layer was formed on the surface of the carbon bipolar plate by the sol-gel process.

In order to form a sol-gel solution, 15 g of vanadium pentoxide ($V_2O_5$) and 0.73 g of molybdenum trioxide ($MoO_3$) were put into an electric furnace to be heated and molten at a temperature above 800 Ω, and then 400 ml of distilled water was added thereto.

Preferably, in order to uniformly apply the thus formed sol-gel solution to the surface of the carbon bipolar plate, a method of thinly applying the sol-gel solution to the surface of the bipolar plate rotated at 2,000 rpm or a method of directly dipping the bipolar plate in the sol-gel solution and lifting up the bipolar plate at a constant rate of 0.5 cm/min was employed.

The bipolar plate surface-treated with the sol-gel solution through the above process was dried at room temperature and atmospheric pressure and then heat-treated in a low oxygen partial pressure atmosphere at a temperature above 500° C. for 4 to 5 hours.

Test Examples

The changes in the properties and microstructure, i.e., the change in the electrical resistance caused by the temperature change, of the variable resistance complex transition metal oxide layers on the surface of the bipolar plates formed by the above examples in accordance with the present invention were tested, and the results will be described with reference to FIGS. 5 and 6 below.

Figure 5A:
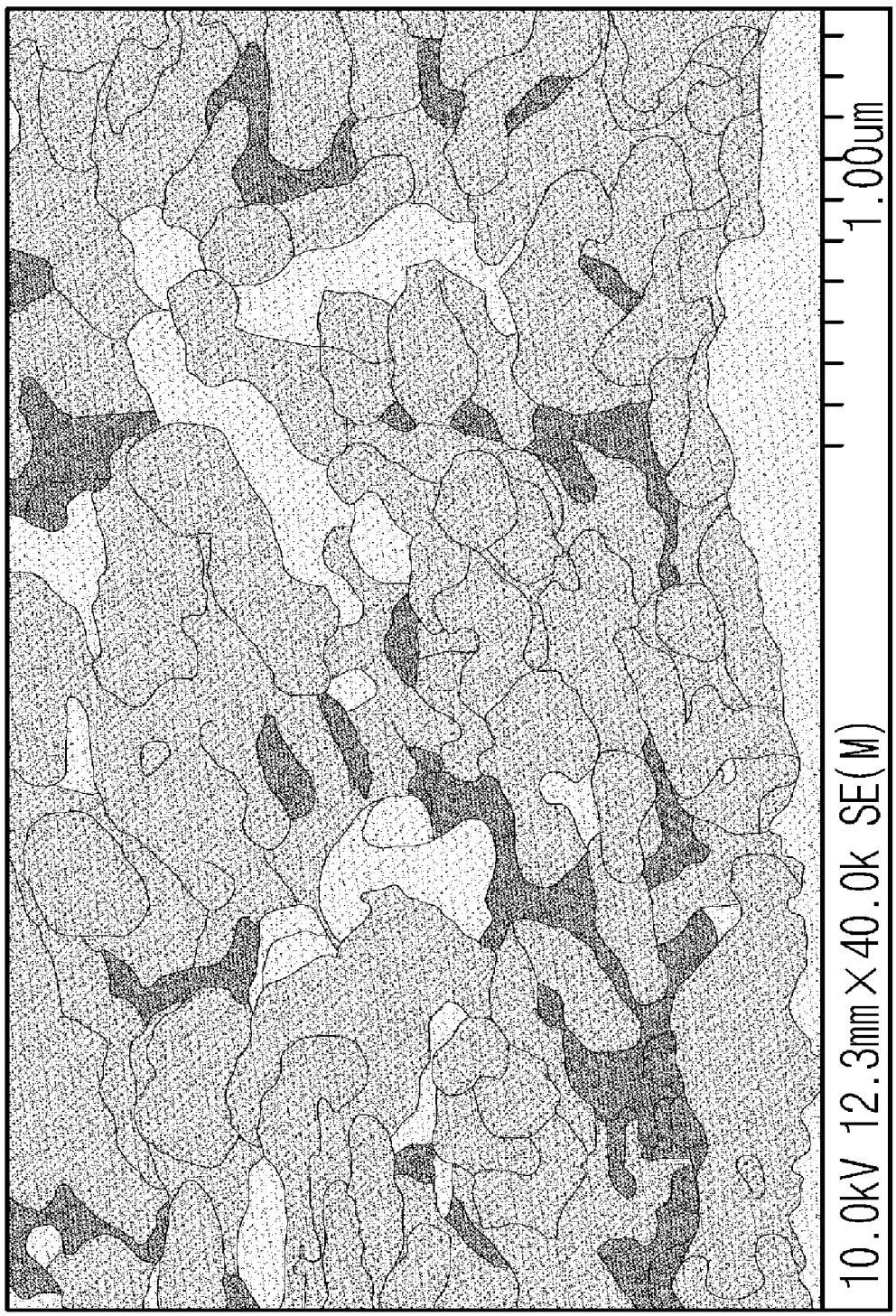
FIGS. 5A and 5B are real images of examples related to the microstructure control due to a change in transition metal content in the complex transition metal oxide layers in accordance with the present invention.
Figure 5B:

FIGS. 5A and 5B are real images of the examples taken using a scanning electron microscope (SEM) to observe the microstructures, controlled by the change in transition metal content, of the variable resistance complex transition metal oxide layers formed by the above processes in accordance with the present invention.

The real images of FIGS. 5A and 5B show the microstructures of the CTR thermistor formed mainly of the vanadium oxide ($VO_2$) among various transition metal oxides, in which FIG. 5A shows a granular microstructure in the cross section of the bipolar plate surface-treated with pure vanadium oxide ($VO_2$) and FIG. 5B shows a layered microstructure in the cross section of the bipolar plate surface-treated with molybdenum-substituted vanadium oxide ($VO_2$).

Since the current of the fuel cell flows in a vertical direction with respect to the bipolar plate surface-treated with the variable resistance complex transition metal oxide, the granular or layered microstructure acts as a major factor in the charge transfer properties of the variable resistance material.

Accordingly, if a small amount of molybdenum is added to the vanadium oxide in accordance with one example of the present invention, the granular crystal structure of FIG. 5A is changed to the layered crystal structure of FIG. 5B, which obviously shows that the charge transfer capability of the molybdenum-substituted vanadium oxide is much improved compared to the pure vanadium oxide.

Figure 6:
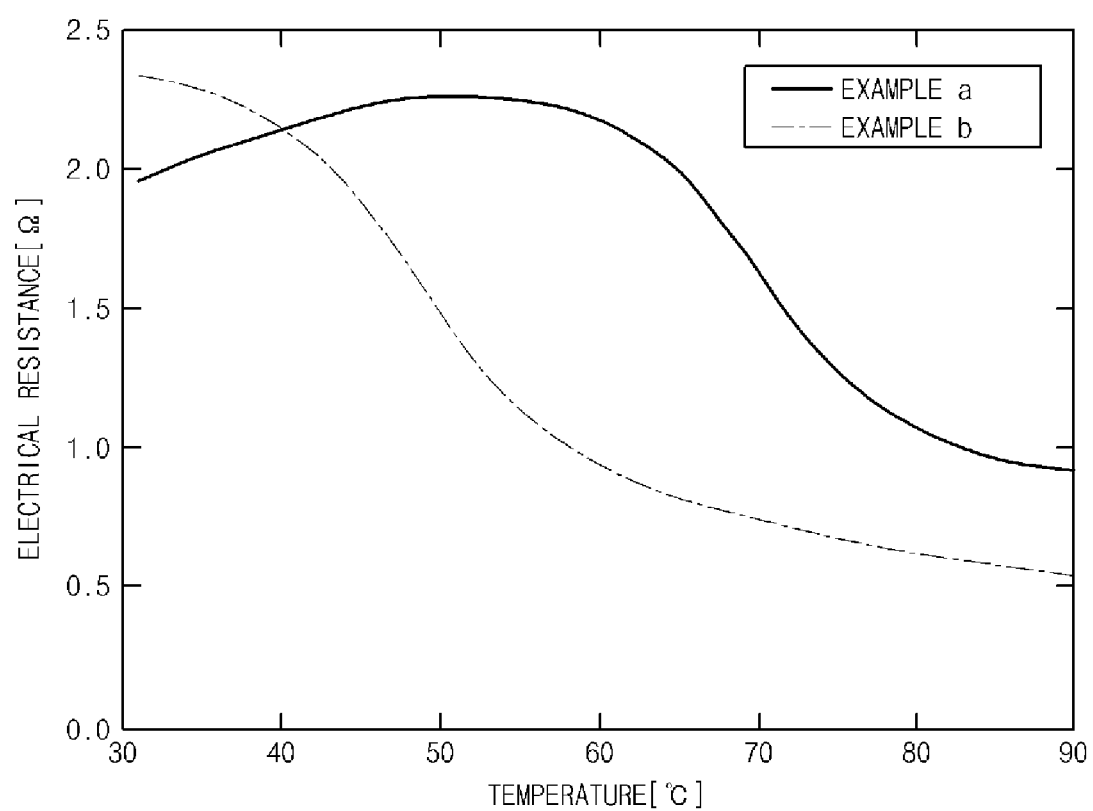
FIG. 6 is a graph showing a change in electrical resistance caused by temperature change in the complex transition metal oxide layers on the bipolar plates in examples of FIGS. 5A and 5B.

FIG. 6 is a graph showing a change in electrical resistance caused by temperature change in the pure vanadium oxide layer and the vanadium oxide layer to which a small amount of molybdenum is added in the examples of FIGS. 5A and 5B.

As can be seen from the examples of the present invention, in the case where the bipolar plate is surface-treated by adding a small amount of a metal element to the complex transition metal oxide, the electrical conduction mechanism of the existing complex transition metal oxide is changed, and thereby the change in electrical resistance due to the temperature change, and the change in phase transition temperature occur.

As can be seen from FIG. 6, in the temperature range of 30 to 60° C., the phase transition temperature is about 70° C. in the case where the bipolar plate is surface-treated with the pure vanadium oxide; on the contrary, the phase transition temperature is lowered to about 50° C. in the case where the bipolar plate is surface-treated with the vanadium oxide to which a small amount of molybdenum is added.

As a result, from the examples of the present invention, it can be seen that the phase transition temperature and the electrical resistance change range can be controlled to coincide with the overall operational temperature range including the cold start temperature range of the fuel cell vehicle by adding any metal element to the transition metal oxide used as a main material.

As described above, the present invention provides the following effects.

whereas described herein, when the fuel cell bipolar plate is suitably surface-treated with an NTC complex transition metal oxide, which is a variable resistance heating element with a negative temperature characteristic, in which the electrical resistance is decreased, preferably exponentially decreased, in a wide temperature range, or with a CTR complex transition metal oxide, which is a variable resistance heating element with a negative temperature characteristic, in which the electrical resistance is considerably reduced by a change in crystal structure (phase transition) above a certain temperature, it is possible that the vehicle fuel cell can suitably ensure the sufficient amount of heat, required during start-up at low temperature, by itself in a short time, reduce the cold start time of the fuel cell vehicle, and improve the acid resistance of the fuel cell system.

In further embodiments of the invention as described herein, since the high electrical resistance of the complex transition metal oxide layer formed on the surface of the bipolar plate suitably induces self-heating (Joule heating) effect when current flows in the vehicle fuel cell by applying an external voltage at low temperature during the initial start-up of the fuel cell, it is possible to supplement the amount of heat required to prevent product water in the fuel cell from freezing without any external energy, and accordingly, the vehicle fuel cell can enter the normal operational temperature range in a suitably short time and it can preferably improve the efficiency of the fuel cell system.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents

What is claimed is:

1. A fuel cell bipolar plate coated with a critical temperature resistance complex transition metal oxide, wherein the critical temperature resistance complex transition metal oxide including at least vanadium oxide as a main component, phosphorus pentachloride, strontium oxide and vanadium pentoxide, and said critical temperature resistance complex transition metal oxide is a temperature-dependent variable resistance heating element having a high resistance at a low temperature and a low resistance at a high temperature, wherein said fuel cell bipolar plate is a carbon or metal fuel cell bipolar plate.

2. A motor vehicle comprising the fuel cell bipolar plate of claim 1.

* * * * *